United States Patent [19]

Miller

[11] Patent Number: 5,428,080
[45] Date of Patent: Jun. 27, 1995

[54] HEAT RESERVOIR DEVICE AND METHOD
[75] Inventor: Michael L. Miller, Dallas, Tex.
[73] Assignee: Plastics Manufacturing Company, Dallas, Tex.
[21] Appl. No.: 212,018
[22] Filed: Mar. 11, 1994
[51] Int. Cl.$^6$ .................. B29D 31/00; C08L 67/06
[52] U.S. Cl. ............................. 523/100; 523/516; 525/39; 525/40; 525/48; 428/35.7; 426/520
[58] Field of Search ............... 525/39, 40, 48; 523/100, 516; 428/35.7; 426/520

[56] References Cited

U.S. PATENT DOCUMENTS 4,895,895  1/1990  Osborne ........................ 523/527
4,943,607  7/1990  Tainsake ....................... 523/527
5,202,366  4/1993  Reid ............................ 523/527

*Primary Examiner*—Patricia A. Short
*Attorney, Agent, or Firm*—John L. Sigalos

[57] ABSTRACT

A heat reservoir device for maintaining a comestible at a desired consumption temperature consisting essentially of a shaped reinforced thermoset polyester resin, preferably one made by reacting isophthalic acid, propylene glycol, and fumaric acid to form the unsaturated polyester and then forming a solution thereof in a vinyl monomer. The invention also include the method of maintaining a comestible at a desired temperature using such device.

9 Claims, 1 Drawing Sheet

HEAT RESERVOIR DEVICE AND METHOD

BACKGROUND OF THE INVENTION

The present invention relates to heat reservoir devices and, in particular, such devices as are used in the food service industry and commonly called "pellets".

Pellets have long been used in the food service industry as a means for maintaining the desired temperature of comestibles on a plate or other container until such time as it is to be consumed. Originally pellets were a "donut" shaped piece of metal which was heated, placed in a stainless steel shell and the plate placed on the top. Both the plate and the pellet were contained by the metal shell. A cover was then placed over the plate. The pellets were previously heated in a heater which would heat the pellets to the desired temperature and allow them to be placed into the stainless steel metal shell as noted. Such pellets would then maintain the temperature of the food in the dish at a desirable heated temperature until it was consumed. Such pellets were commonly used in hospitals, nursing homes, and the like where food is prepared and placed on plates in a central kitchen and then placed in carts to be dispensed to the consumers throughout the particular hospital, nursing home, and the like. This is now a standard means of maintaining the food at a proper temperature until such time as it is placed before the patient or consumer. These metal pellets were not only expensive, but heavy and difficult to handle.

Consequently, improvements were needed, one of which was a unitized base which consisted of two stainless steel shells with an iron disc sandwiched in between. Some of these new style pellets also had insulation between the bottom outer layer and the disc. Further, single piece bases were also used made of either aluminum or stainless steel, some coated and some of the aluminum bases were anodized.

All of the foregoing pellets worked on the principle of heating a mass of metal so as to act as a heat radiator to keep the food hot for a period of time.

These again were unsuitable because of the cost and weight of the metal, and their inefficient radiation properties.

Another style of pellet that came on the market was a wax-filled pellet which consisted of two steel shells welded together with wax, similar to paraffin wax, sealed inside. These pellets worked on the principle of phase change. The wax, when heated, absorbs the heat energy as it is transformed from a solid to a liquid and as it slowly goes back from a liquid to a solid it gives up that heat energy, which energy is absorbed by a plate and food therein sitting in the pellet. A variation of this type of pellet was one made of two plastic shells sealed together with dead air space therebetween.

Again, the cost of making such plates was excessive, and the amount of wax that could be included was limited so again there was not the desired degree of heat transfer available.

In an attempt to cut costs by making products which were easily manufactured and with less weight, efforts were made to use plastic pellets made of plastics having a slow rate of heat transfer. An example of such is melamine which has a slow degree of heat transfer. Once heated it gives up its heat very slowly so when the heated plate with food and its cover is placed on the pellet it helps to maintain the food temperature at the desired temperature for a longer period of time. However, melamine pellets are undesirable in that when repeatedly heated in the devices commonly used to heat pellets they tend to shrink and become brittle. As a consequence, special heating devices are required which add steam to the heat source as a means of preventing the shrinking and drying of the melamine. Such special heating device adds to the cost.

SUMMARY OF THE INVENTION

The instant invention overcomes the problems of the prior art and provides a unique plastic pellet which does not require heating in a moist atmosphere in order to avoid any shrinking or brittleness and which has a slow rate of heat transfer.

Briefly stated, the present invention comprises a heat reservoir device comprising a shaped reinforced thermoset polyester resin.

The invention also comprises the method of maintaining the temperature of comestibles as hereinafter set forth.

DETAILED DESCRIPTION

Figure 1:
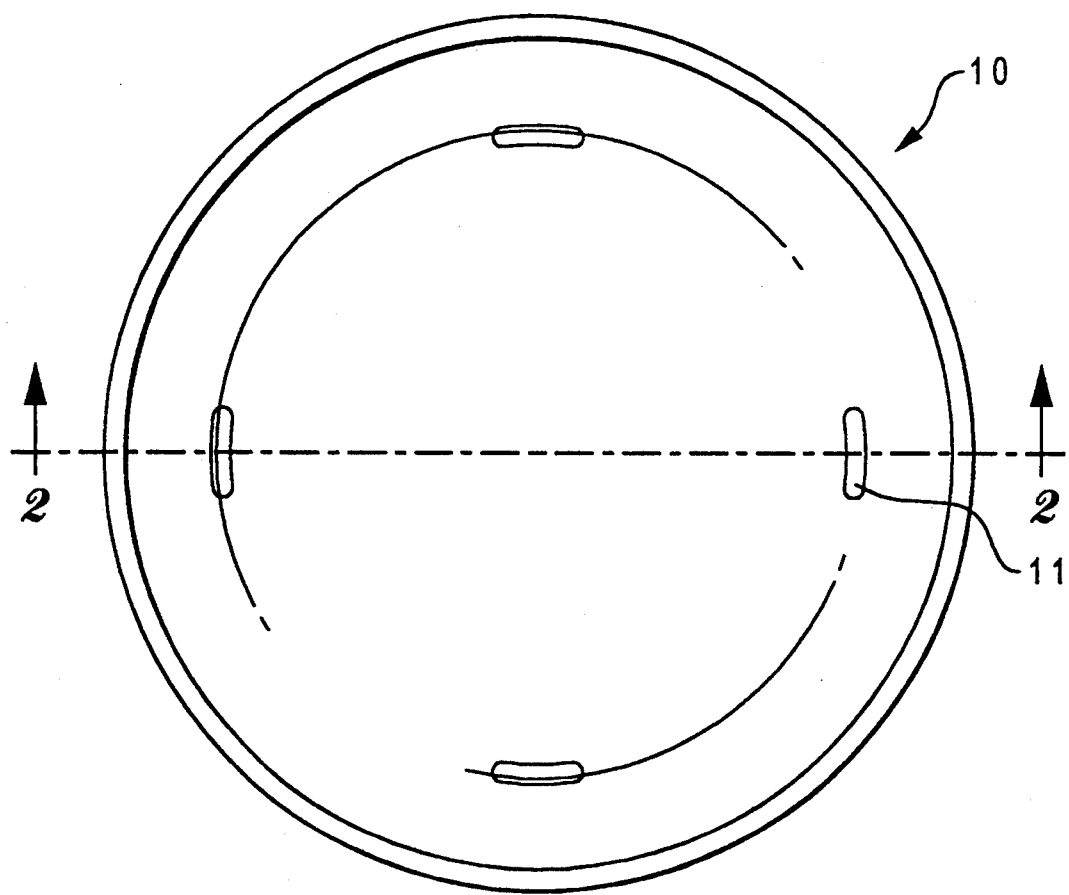
FIG. 1 is a top plan view of the preferred pellet of the subject invention.
Figure 2:
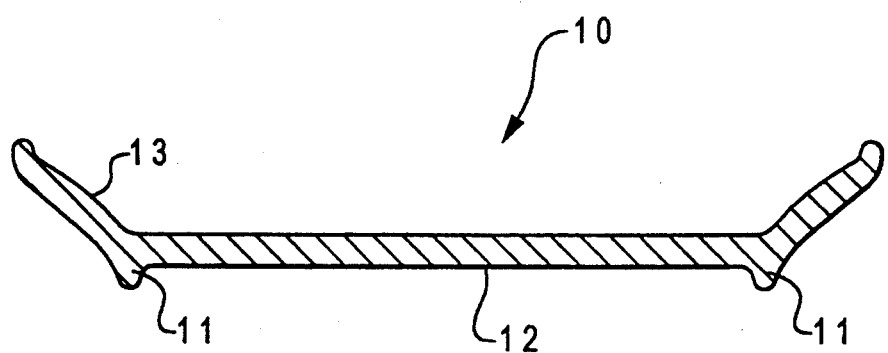
FIG. 2 is a sectional view taken along 2—2 of FIG. 1.

The essential element of the instant invention is the utilization of a thermoset polyester resin. It has been found that uniquely pellets made from such resins can be heated to a temperature suitable for use in the food industry and which will give up their heat slowly, so that when a heated plate laden with comestibles and a cover are placed thereover, it will maintain the proper food temperature. Most importantly, the heating of the pellet made of the thermoset polyester resin can be accomplished without the need to heat the same in a moisture-laden atmosphere. The pellets can be heated in conventional convected air pellet heaters. This lowers the cost of heating the same and avoids the need to have special heaters. Any conventional heating device used to heat metal pellets can be utilized.

As used herein, the term "heat reservoir device" is synonymous with pellets and, as with prior pellets they can be of any of a wide variety of shapes, although it is preferred that the pellets have means permitting thermal air flow about the entire pellet as hereinafter described.

With respect to the thermoset polyester resin used, any conventional thermoset polyester resin can be utilized, although it is preferred to use reinforced resins, particularly those reinforced with fibers such as glass fibers and which also contain fillers such as alumina, clay and the like.

The term "thermoset polyester resin" as used herein is intended to cover alkyd resins as well as polyester resins. Such resins are formed by the interaction of various known unsaturated acids or anhydrides and polyhydric alcohols. When these polymers are dissolved in a cross-linking vinyl monomer, most usually styrene, or a mixture of styrene and a mono- or polyfunctional methacrylate, the solutions of these polymers in the vinyl monomer are usually called polyester resins. They are cured with the aid of free-radical initiators such as the hydroperoxides to yield thermoset articles.

It has been found that for optimum desired properties in the pellets such as resistance to scratching, surface hardness, resistance to breakage, temperature retention, resistance to chemicals, washability, and long service life that the resin used be one formed by the reaction of isophthalic acid, propylene glycol, and fumaric acid and as the dilute monomer either styrene alone or a combination of styrene and methyl methacrylate. It is preferred that the degree of unsaturation of the cured polyester resin, as represented by mol % fumarate be 50–70%.

As noted, the resins can be compounded with fillers and/or fibers in the liquid stage and then are cured with the aid of the free radical initiators to polymerize the resin and form the thermoset articles. The unsaturated polyesters can be mass cast, laminated, molded, and pultruded into a wide variety of shapes and, of course, coloring added to give the desired color.

Once the components are admixed, the pellet is formed by preferably molding it to the particular shape desired, which shape can vary widely, depending upon the size and shape of the plates or other food container in which the food to be heated is placed. The pellet is shaped to conform to such plate or container for purposes of having the heat from the pellets dispensed into the plate or other container and the food to maintain the temperature of the food.

The pellets are usually disc-shaped by virtue of the fact that most tableware is of such a shape, and the thickness thereof can vary widely and is that required to store the degree of heat that it is desired to be dispensed into the comestible(s) placed thereon for a given period of time. The particular thickness and temperature to which the pellets are heated can be readily determined for any given set of conditions by routine experimentation.

It is preferred, however, to use pellets that have means permitting thermal air flow about the entire pellet. This is preferred since the pellets are stacked when placed in heaters to be brought to the required temperature. Such heaters are conventionally convected air heaters and if the plates are tightly nested the heated air cannot circulate about the entire surface of each plate to rapidly and more uniformly heat the same.

A preferred pellet 10 is depicted in FIG. 1 and shows legs 11 spaced about the bottom 12 of pellet 10 and having an upwardly sloping sidewall 13. When a number of pellets 10 are stacked in a heater to be brought to the proper temperature, legs 11 of each space the pellets from the adjoining pellets thereby permitting thermal air flow about the top and bottom surfaces of each pellet.

The invention will be further described in connection with the following example which is set forth for purposes of illustration only.

EXAMPLE 1

Pellets having the shape of the pellet of FIG. 1 were formed by molding a polyester resin composition that was approximately 66 wt. % solids and the balance organic resin.

The resin was a polyester resin formed by reacting isophthalic acid, polypropylene glycol, and fumaric acid and utilizing styrene as a cross-linker. Such a resin is commercially available as CORELYN ®. Glass fibers and alumina were the solids added. The curing catalyst was dimethylethyl hydroperoxide.

The pellets were approximately 9.5 inches in diameter and 0.32 inches thick. Upon testing it was found that these pellets could be heated to temperatures as high as 400° F. in the absence of moisture without being distorted. Melamine can only be heated to 220° F.; at higher temperatures it will thermally degrade. Also, they can maintain comestibles on a plate placed thereon at a temperature of 140° F. for 60 minutes. Most importantly, the pellets can be used in microwave ovens without adverse effect, which is not possible with pellets made of melamine.

This is of importance in the food service industry, since often when food is to be served to a patient at an unusual time, the pellet and food-containing plate assembly can be placed in a microwave oven and heated to proper temperature.

If desired, any conventional material known to absorb microwave energy can be included as part of the resin composition used to form the pellets. Uniform distribution of such distribution in the composition and in the pellets formed therefrom will enable the pellets themselves to be heated to the desired temperature in a microwave oven.

It is contemplated that thermoset epoxy resins may also be suitable to form pellets having the required properties discussed herein.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A heat reservoir device consisting essentially of a reinforced thermoset polyester resin having an upwardly sloping sidewall capable of being heated to service temperature in the absence of moisture, and having a thickness sufficient to store heat sufficient to maintain a comestible at a temperature of at least 140° F. for sixty minutes.

2. The device of claim 1 wherein said resin is reinforced with glass fibers and alumina.

3. The device of claim 1 wherein said resin is formed by reacting isophthalic acid, propylene glycol, and fumaric acid to form an unsaturated polyester and then forming a solution thereof with styrene or a mixture of styrene and methyl methacrylate.

4. The device of claim 3 in the shape of a disc having means thereon for permitting thermal air flow over the entire surface thereof when nested with at least one like device.

5. A method of maintaining the temperature of a comestible at a consumption temperature over an extended period of time comprising placing the comestible in heat conductivity contact with a heated heat reservoir device consisting essentially of a heated shaped reinforced thermoset polyester resin, said device having a thickness sufficient to store heat sufficient to maintain the comestible at the consumption temperature over an extended period of time and said device having been heated by convected air in the absence of added moisture.

6. The method of claim 5 wherein said resin is reinforced with glass fibers and alumina is added as a filler.

7. The method of claim 6 wherein said resin is formed by reacting isophthalic acid, propylene glycol, and fumaric acid to form an unsaturated polyester and then forming a solution thereof with styrene or a mixture of styrene and methyl methacrylate.

8. The method of claim 7 in the shape of a disc having means thereon for permitting thermal air flow over the entire surface thereof when nested with at least one like device.

9. The method of claim 8 wherein said device when heated to its service temperature is capable of maintaining a comestible at a temperature of 140° F. for 60 minutes.

* * * * *